United States Patent [19]

Nakagawa

[11] Patent Number: 5,171,770

[45] Date of Patent: Dec. 15, 1992

[54] WEATHER-RESISTANT POLYACETAL RESIN COMPOSITIONS AND WEATHER-RESISTANT MOLDED ARTICLES FORMED THEREOF

[75] Inventor: Nozomu Nakagawa, Shizuoka, Japan

[73] Assignee: Polyplastics Co., Ltd., Osaka, Japan

[21] Appl. No.: 561,991

[22] Filed: Aug. 1, 1990

[30] Foreign Application Priority Data

Aug. 1, 1989 [JP] Japan .................................. 1-199985

[51] Int. Cl.$^5$ .............................................. C08K 5/34
[52] U.S. Cl. ........................................ 524/91; 524/99; 524/102; 524/239; 524/241; 524/242
[58] Field of Search ................................. 524/99–103, 524/241, 242

[56] References Cited

U.S. PATENT DOCUMENTS

| | | | |
|---|---|---|---|
| 3,940,365 | 2/1976 | Grossmann et al. ................ | 524/100 |
| 4,110,304 | 8/1978 | Gilg et al. ............................ | 524/100 |
| 4,446,263 | 5/1984 | Bryant ................................. | 524/91 |
| 4,717,745 | 1/1988 | Ishii et al. ........................... | 524/100 |
| 4,731,396 | 3/1988 | Auerbach et al. .................. | 524/100 |
| 4,843,115 | 6/1989 | Auerbach et al. .................. | 524/100 |
| 4,975,478 | 12/1990 | Okuda ................................ | 524/100 |

FOREIGN PATENT DOCUMENTS 0288254 10/1988 European Pat. Off. .

*Primary Examiner*—Kriellion S. Morgan
*Attorney, Agent, or Firm*—Nixon & Vanderhye

[57] ABSTRACT

Weather-resistant polyacetal compositions and molded parts formed of such compositions including a polyacetal base resin and a weather stabilization packaged which necessarily includes a UV-light stabilizer for the polyacetal resin, and a basic compound which contains at least one tertiary nitrogen atom and at least one metal carboxylate group in its molecule. The compositions of the present invention may optionally include a colorant.

3 Claims, No Drawings

WEATHER-RESISTANT POLYACETAL RESIN COMPOSITIONS AND WEATHER-RESISTANT MOLDED ARTICLES FORMED THEREOF

FIELD OF THE INVENTION

The present invention relates to polyacetal resin compositions which exhibit excellent weather resistance properties, and to molded articles formed of such weather-resistant polyacetal compositions. In particular, the present invention provides a polyacetal resin composition having excellent weather resistance properties produced by adding to a polyacetal base resin a weather (UV-light) stabilizer and a specific basic compound having at least one tertiary nitrogen atom and at least one metal carboxylate group in its molecule.

BACKGROUND AND SUMMARY OF THE INVENTION

As is well known, polyacetal resins are used in a number of end-use applications as engineering plastics due to their excellent physical properties, such as their excellent mechanical and electrical properties, as well as their excellent chemical resistance and heat resistance properties. However, polyacetal resins having further property improvements are needed as their use expands into new applications.

For example, further improvements are, in some cases, required in the weather resistance properties of polyacetal compositions. In particular, the properties of exterior parts of automobiles and parts of electrical appliances and business machines are likely to deteriorate when subjected to ambient conditions of use, such as solar rays, rain, fluorescent lamps and air. Thus, parts formed of polyacetal resins may, during use, become discolored, lose their surface smoothness resulting in a reduction of gloss, and/or experience crack formation on the parts' surfaces. Such deterioration may thus impair the parts' appearance and/or mechanical properties.

It has been proposed previously to improve the weather (UV-light) resistance of polyacetal resins by incorporating stabilization "packages" of various weather (UV-light) stabilizers therein. Although some effects are obtained by use of conventional weather stabilizer packages, the surface conditions (e.g. cracks, glass and the like) and the mechanical properties of polyacetal moldings after being exposed to solar rays (ultraviolet rays), rain, and the like for prolonged time periods are not always satisfactory. Moreover, increased weather resistance properties have more recently been required to protect the polyacetal parts against severe environmental pollution problems, such as acid rain.

Simply increasing the amount of weather stabilizers only results in limited improvements to the weather resistance properties of polyacetal resin compositions. In addition, an increase in the amount of weather stabilizers usually impairs the mechanical properties (such as tensile strength and bending strength) of the polyacetal composition. The stabilizers furthermore may adhere to the mold to form mold deposits during molding thereby reducing the dimensional accuracy and/or detracting from the appearance of the moldings. As a result, an increase in the time needed to clean the mold ensues which, in turn, reduces the efficiency of the molding operation. Another problem that is encountered is that weather stabilizers may "bleed" onto the surfaces of the moldings which detrimentally affects their appearance. Thus, the conventional weather stabilization techniques are still unsatisfactory in many respects.

The present invention is directed towards improving the weather (UV-light) stability of polyacetal resin compositions (particularly for molded parts used outdoors).

Broadly, the present invention is directed to normally solid weather-resistant polyacetal compositions, and molded parts formed thereof, comprised of a polyacetal base resin, and a weather-resistant effective amount of a weather stabilization package which includes a UV-light stabilizer and a basic compound having at least one tertiary nitrogen atom and at least one metal carboxylate group in its molecule.

More specifically, the present invention relates to weather-resistant polyacetal resin compositions and molded parts comprised of:

(A) a polyacetal base resin;

(B) between 0.01 to 5% by weight, based on the entire weight of the composition, of a weather (UV-light) stabilizer, and (C) between 0.01 to 3% by weight, based on the entire weight of the composition, of a basic compound containing at least one tertiary nitrogen atom and at least one metal carboxylate group in the molecule.

Optionally, between 0.1 to 5% by weight, based on the entire weight of the composition, of a colorant may be added to the above-described components.

DETAILED DESCRIPTION OF THE PREFERRED EMBODIMENTS

The polyacetal base resin used in the present invention is a polymeric compound having oxymethylene groups ($-CH_2O-$) as its main constituent units. The polyacetal base resin may be any polyoxymethylene homopolymer, copolymer, terpolymer or block copolymer containing a minor amount of other constituent units in addition to the oxymethylene units. The molecule of the polyacetal resin (A) may also have linear, branched or crosslinked structures. The degree of polymerization of the polyacetal resin (A) is furthermore not particularly limited provided it is normally solid at ambient conditions. The polyacetal base resin is preferably used in amounts between 92 to 99.98% by weight (based on the total weight of the composition).

The preferred UV-light stabilizers usable in the present invention include one or more compounds selected from the group consisting of (1) benzotriazoles, (2) benzophenones, (3) aromatic benzoates, (4) cyanoacrylates, (5) oxalanilides and (6) hindered amines.

Examples of such UV-light stabilizers are as follows:

(1) benzotriazoles 2-(2'-hydroxy-5'-methylphenyl)-benzotriazole,
2-(2'-hydroxy-3',5'-di-t-butylphenyl)-benzotriazole,
2-(3,5-di-t-amyl-2-hydroxyphenyl)-benzotriazole,
2-(2'-hydroxy-3',5'-diisoamylphenyl)-benzotriazole,
2-[2-hydroxy-3,5-bis($\alpha,\alpha$-dimethyl-benzyl)phenyl] benzotriazole and 2-(2'-hydroxy-4'-octoxyphenyl) benzotriazole, (2) benzophenones 2,4-dihyroxybenzophenone,
2-hydroxy-4-methoxybenzophenone,
2-hydroxy-4-octoxybenzophenone,
2-hydroxy-4-dodecyloxybenzophenone, 2,2'-dihydroxy-4-methoxybenzophenone,
2,2'-dihydroxy-4,4'-dimethoxybenzophenone,
2-hydroxy-4-methoxy-5-sulfobenzophenone and
2-hydroxy-4-oxybenzylbenzophenone, (3) aromatic benzoates p-t-butylphenyl salicylate and p-octylphenyl salicylate, (4) cyanoacrylates 2-ethylhexyl
2-cyano-3,3'-diphenylacrylate and ethyl
2-cyano-3,3'-diphenylacrylate, and (5) oxalanilides N-(2-ethylphenyl)-N'-(2-ethoxy-5-t-butylphenyl) oxalamide and
N-(2-ethylphenyl)-N'-(2-ethoxyphenyl)oxalamide.

Examples of the hindered amines include piperidine derivatives having a sterically hindered group, such as
4-acetoxy-2,2,6,6-tetramethylpiperidine,
4-stearoyloxy-2,2,6,6-tetramethylpiperidine,
4-acryloyloxy-2,2,6,6-tetramethylpiperidine,
4-methoxy-2,2,6,6-tetramethylpiperidine,
4-benzoyloxy-2,2,6,6-tetramethylpiperidine,
4-cyclohexyloxy-2,2,6,6-tetramethylpiperidine,
4-phenoxy-2,2,6,6-tetramethylpiperidine,
4-benzyloxy-2,2,6,6-tetramethylpiperidine,
4-(phenylcarbamoyloxy)-2,2,6,6-tetramethylpiperidine,
bis(2,2,6,6-tetramethyl-4-piperidyl) oxalate,
bis(2.2,6,6-tetramethyl-4-piperidyl) malonate,
bis(2.2,6,6-tetramethyl-4-piperidyl) adipate,
bis(2,2,6,6-tetramethyl-4-piperidyl) sebacate,
bis(1,2,2,6,6-pentamethylpiperidyl) sebacate,
bis(2,2,6,6-tetramethyl-4-piperidyl) terephthalate,
1,2-bis(2,2,6,6-tetramethyl-4-jpiperidyloxy) ethane,
bis(2.2,6,6-tetramethyl-4-piperidyl) hexamethylene-1,6-dicarbamate, bis(1-methyl-2,2,6,6tetramethyl-4-piperidyl)adipate and tris(2,2,6,6-tetramethyl-4-piperidyl) benzene-1,3,5-tricarboxylate.
high-molecular piperidine derivative polycondensates such as dimethyl
succinate/1-(2-hydroxyethyl)-4-hydroxy-2,2,6,6tetramethylpiperidine polycondensate are also usable.

In the event that a combination of UV-light stabilizers is employed whereby one of the UV-light stabilizers is a benzophenone, then weight ratio of the non-benzophenone UV-light stabilizer to the benzophenone UV-light stabilizer is preferably between 1:99 to 99:1, more preferably between 20:80 to 80:20 and most preferably between 40:60 to 60:40.

The UV-light stabilizers are used alone or more preferably, in combination of two or more of the same. Particularly, a combination of one or more of the weather stabilizers (1) to (5) with the hindered amine (6) is preferred.

The UV-light stabilizer is used in an amount between 0.01 to 5% by weight, particularly 0.02 to 3% by weight, based on the weight of the entire composition. Insufficient weather-resistance effects attributable to be stabilizer are seen when the UV-light stabilizer is used in amounts less than 0.01% by weight. Excess amounts of UV-light stabilizers are economically disadvantageous and impairs the composition's mechanical properties as well as causing mold staining.

The basic compound usable in the present invention is a compound containing at least one basic compound is one in which all of the nitrogen atoms are represented by the following formula (1):

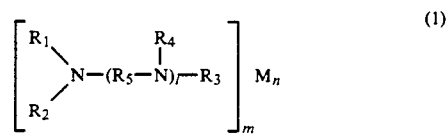

wherein at least one of $R_1$, $R_2$, $R_3$ and $R_4$ represents a carboxyl group of the following formula (2) and the others represent an alkyl group having 1 to 7 carbon atoms, $R_5$ represents an alkylene group having 2 to 10 carbon atoms or an alkylene group having 1 to 3 ether bonds in its chain, M represents one or more alkali metals or alkaline earth metals, l represents an integer of 0 to 6, m represents 1 or 2, and n is an integer (preferably no greater than 9) such that the sum of the valences of the metals M will be equal to the total number of the carboxyl groups of the compound:

in which $R_6$ represents an alkylene group having 1 to 6 carbon atoms which is directly bonded to the nitrogen atom in the formula (1).

The alkali or alkaline earth metals represented by M in formula (1) are, moreover, connected to the respective carboxyl groups of $R_1$-$R_4$.

The alkali or alkaline earth metals represented by M in formula (1) are, moreover, connected to the respective carboxyl groups of $R_1$-$R_4$.

Examples of preferred basic compounds include salts of at least one of N,N-dimethylglycine, N-methyliminodiacetic acid, nitrilotriacetic acid, nitrilopropionic acid, ethylenediaminetetraacetic acid, ethylenediaminetetrapropionic acid, diethylenetriaminepentaacetic acid, diethylenetriaminiepentapropionic acid, triethylenetetraminehexaacetic acid, triethylenetetraminehexapropionic acid, cyclohexylenedinitrilotetraacetic acid, cyclohexylenedinitrilotetrapropionic acid and ethylenedioxybis(ethylamine)-N,N,N',N'-tetraacetic acid with at least one of lithium, sodium, potassium, rubidium, cesium, beryllium, magnesium, calcium, strontium and barium each in an equivalent amount. Among them, preferred are salts of at least one of N-methyliminodiacetic acid, nitrilotriacetic acid, ethylenediaminetetraacetic acid, diethylenetriaminepentaacetic acid, triethylenetetraminehexaacetic acid and ethylenedioxybis(ethylamine)-N,N,N',N'-tetraacetic acid with at least one of lithium, sodium, potassium magnesium and calcium each in an equivalent amount.

Particularly preferred examples of the basic compounds include sodium N-methyliminodiacetate, trisodium nitrilotriacetate, tetrasodium ethylenediaminetetraacetate, tetrapotassium ethylenediaminetetraacetate, dicalcium ethylenediaminetetraacetate, pentasodium diethylenetriaminepentaacetate, pentapotassium diethylenetriaminetriaminepentaacetate, hexasodium triethylenetetraminehexaacetate and tetrasodium ethylenedioxybis(ethylamine)-N,N,N',N'-tetraacetate.

The amount of the basic compound used herein is between 0.01 to 3% by weight, particularly preferably between 0.03 to 1% by weight, based on the total weight of the composition. When the basic compound is present in insufficient amounts, little (if any) beneficial weather-resistance effects, and particularly prevention of crack formation on the molding surface, are achieved. On the contrary, when excessive amounts of the basic compound are used, the mechanical and thermal stability properties are deleteriously influenced.

When the basic compound is used in combination with the UV-light stabilizer, the weather stability of the polyacetal resin composition synergistically improves and is far superior to that of a polyacetal resin composition containing only the UV-light stabilizer. Moreover, weather resistance of polyacetal resin compositions is not improved when only the basic compound is employed as a weather stabilizer.

The compositions of the present invention exhibit improved surface conditions. Specifically, the time period before crack formation occurs when exposed to ultraviolet rays is far longer as compared to conventional polaycetal compositions. In addition, the acid resistance of the compositions according to the present invention is significantly greater as compared to conventional compositions not containing the basic compound as described above.

Therefore, the weather-resistant polyacetal resin compositions of the present invention are suitably used as a material for molded parts in all end-use environments requiring excellent weather (UV-light) resistance. In particular, the compositions of the present invention may be used as a starting material for components which are to be exposed to solar rays, rain and air for prolonged time period, such as exterior parts of automobiles (for example, outer door handles, fuel lids, wheel covers, front fenders and spoilers), electrical appliances, cameras, other industrial parts, construction materials, pipes, and various household goods.

The weather-resistance improvements obtained according to the present invention are particularly evident when the resin composition contains a colorant.

The preferred colorants include organic and organic dyes and pigments. The inorganic pigments include carbon black, calcium carbonate, magnesium carbonate, titanium oxide, zinc white, zinc sulfide, red iron oxide, chrome yellow, cadmium sulfide and ultramarine. The organic dyes and pigments include azo, phthalocyanine, quinacridone, anthraquionone, dioxazine, perylene, perinone, anthraquinone and indigo dyes and pigments. The colorants are used either alone or in combination of two or more of the same. The incorporation of carbon black particularly exhibits a synergistic effect in further improving the weather stability and thus represents a preferred colorant.

The amount of the colorant used is preferably in the range between 0.1 to 5% by weight based on the total composition weight depending on the coloring effect that is desired. When it is less than 0.1% by weight, non-uniformly dyed products result. On the other hand, when it exceeds 5% by weight, the properties of the compositions are seriously impaired.

The combination of the UV-light stabilizer with the basic compound according to the present invention is not only effective in imparting weather resistance to the resin material per se, but also is quite effective in preventing fading or discoloration of the dyes and pigments added to the resin. Thus, the present invention is quite effective in retaining the appearance and quality of the colored polyacetal products.

The compositions of the present invention desirably further contain known stabilizers in order to further improve the thermal stability characteristics. It is desirable for this purpose to use one or a combination of two or more compounds selected from the group consisting of known antioxidants, nitrogen-containing compounds and alkali or alkaline earth metal compounds.

The compositions of the present invention can be used also in combination with polymeric materials having excellent weather resistance, such as acrylate resins.

The compositions of the present invention may further contain known additives to impart desired properties depending on the composition's use. These additives include, for example, lubricants, nucleating agents, releasing agents, antistatics, surfactants, organic polymeric materials, and inorganic or organic, fibrous, granular or platy fillers, and can be used either alone or in combination of two or more of the same.

The compositions of the present invention can be produced by known processes using known apparatus ordinarily used for the production of synthetic resin compositions. For example, the necessary components may be mixed together, kneaded, and extruded with a single-screw or twin-screw extruder to form pellets, which are subsequently molded into molded parts. The preparation of the composition can be conducted simultaneously with the molding step using a molding machine. Alternatively, a part or the entirety of the resin components may be pulverized in order to facilitate their dispersion, mixed and melt-extruded to form pellets.

The stabilizer and the additives may be added in any step of the process. Usually, they are added immediately before the production of the moldings, i.e. prior to forming the final product.

The resin composition of the present invention can be molded by extrusion, injection, compression, vacuum, blow and foam molding processes well known in the art.

EXAMPLES

The following nonlimiting Examples will further illustrate the present invention.

In the following Examples, the characteristic values such as weather resistance were determined by the following methods:

(1) Weather Resistance Tests

(i) Crack Formation Time

Test pieces were irradiated with ultraviolet rays using an ultra-accelerated weatherometer (SUV-W-11; mfd. by Iwasaki Electric Co., Ltd.) in an atmosphere at 83° C. The surfaces of the test pieces were observed with a magnifying lens at 10× magnification to confirm the crack formation. The crack formation time was determined to be the time at which crack formation began, with higher value suggesting better weather resistance.

(ii) Changes in the Surface Conditions

The test pieces were irradiated with ultraviolet rays with same weatherometer as that described above for a predetermined period of time. Changes in the extent of cracks, hue and gloss of the test pieces after the irradiation were observed. The extent of the changes was classified into the following five groups:

0: substantially no change recognized,
1: very small cracks observed at the periphery of the test piece, 2: very small cracks observed at the periphery and a part of the center of the test piece, and the whole surface of the test piece slightly yellowed or whitened, 3: the cracks are slight yellowing or whitening observed on the whole surface of the test piece, and the gloss slightly impaired, and 4: large cracks formed on the whole surface of the test piece, and the gloss seriously impaired.

(2) Crack Formation by Treatment with Acidic Water

The test pieces were immersed in an acidic water solution containing 3.5 mol/l of hydrochloric acid and 6.5 mol/l of sulfuric acid at 40° C. for 10 min, washed with water and dried. Very small cracks formed at the periphery of the test pieces were observed with an optical microscope at 50× magnification and the extent thereof was classified into four groups of 0 to 3, with a smaller number indicating less crack formation (0: no crack formation observed).

EXAMPLES 1 to 13 AND COMPARATIVE EXAMPLES 1 to 16

A UV-light stabilizer (B), a basic compound (c) and optionally, a colorant (D) were blended with a polyacetal base resin (A) (trade name: Duracon (M90); a product of Polyplastics Co., Ltd.) as shown in Table 1 to obtain a mixture. The mixture was melt-kneaded with a 30 mm double-screw extruder to form a composition in pellet form. The pellets were then molded into test pieces with an injection molding machine to evaluate their weather resistance and other characteristics. For comparison, the same procedure as above was repeated except that none, or only one of the UV-light stabilizer (B) and the basic compound (C) was used. The results are shown in Table 1.

TABLE 1

| No. | | (A) Polyacetal resin (wt. %) | (B) Weather (light) stabilizer | | (C) Basic compound note 3 (wt. %) | (D) Colorant note 4 (wt. %) | Weather (light) resistance test | | | | Crack formation after treatment with acidic water |
|---|---|---|---|---|---|---|---|---|---|---|---|
| | | | note 1 (wt. %) | note 2 (wt. %) | | | crack formation time (h) | surface condition after | | | |
| | | | | | | | | 40 h | 80 h | 120 h | |
| Example | 1 | 99.2 | B-1 (0.6) | — | C-1 (0.2) | — | 30 | 2 | 4 | 4 | 0 |
| | 2 | 99.2 | B-2 (0.6) | — | C-1 (0.2) | — | 30 | 2 | 4 | 4 | 0 |
| | 3 | 98.7 | B-2 (0.6) | — | C-1 (0.2) | 0.5 | 40 | 1 | 3 | 4 | 0 |
| | 4 | 98.7 | — | B-3 (0.6) | C-1 (0.2) | 0.5 | 40 | 1 | 3 | 4 | 0 |
| | 5 | 99.3 | B-1 (0.3) | B-3 (0.3) | C-1 (0.1) | — | 70 | 0 | 1 | 3 | 0 |
| | 6 | 99.2 | B-1 (0.3) | B-3 (0.3) | C-1 (0.2) | — | 70 | 0 | 1 | 3 | 0 |
| | 7 | 99.2 | B-2 (0.3) | B-3 (0.3) | C-1 (0.2) | — | 80 | 0 | 1 | 2 | 0 |
| | 8 | 98.9 | B-2 (0.6) | B-3 (0.3) | C-1 (0.2) | — | 90 | 0 | 0 | 2 | 0 |
| | 9 | 99.2 | B-2 (0.3) | B-3 (0.3) | C-2 (0.2) | — | 80 | 0 | 1 | 3 | 0 |
| | 10 | 98.7 | B-1 (0.3) | B-3 (0.3) | C-1 (0.2) | 0.5 | 130 | 0 | 0 | 0 | 0 |
| | 11 | 98.7 | B-2 (0.3) | B-3 (0.3) | C-1 (0.2) | 0.5 | 140 | 0 | 0 | 0 | 0 |
| | 12 | 98.7 | B-2 (0.3) | B-4 (0.3) | C-3 (0.2) | 0.5 | 120 | 0 | 0 | 1 | 0 |
| | 13 | 98.7 | B-1 (0.3) | B-4 (0.3) | C-2 (0.2) | 0.5 | 120 | 0 | 0 | 1 | 0 |
| Comparative Example | 1 | 100 | — | — | — | — | 10 | 4 | 4 | 4 | 4 |
| | 2 | 99.4 | B-1 (0.6) | — | — | — | 20 | 3 | 4 | 4 | 4 |
| | 3 | 99.4 | B-2 (0.6) | — | — | — | 20 | 3 | 4 | 4 | 4 |
| | 4 | 99.8 | — | — | C-1 (0.2) | — | 10 | 4 | 4 | 4 | 1 |
| | 5 | 98.9 | B-2 (0.6) | — | — | 0.5 | 30 | 2 | 4 | 4 | 4 |
| | 6 | 99.3 | — | — | C-1 (0.2) | 0.5 | 15 | 4 | 4 | 4 | 1 |
| | 7 | 98.9 | B-3 (0.6) | — | — | 0.5 | 30 | 2 | 4 | 4 | 4 |
| | 8 | 99.4 | B-1 (0.3) | B-3 (0.3) | — | — | 40 | 1 | 4 | 4 | 4 |
| | 9 | 99.4 | B-2 (0.3) | B-3 (0.3) | — | — | 40 | 1 | 3 | 4 | 4 |
| | 10 | 99.1 | B-2 (0.6) | B-3 (0.3) | — | — | 40 | 1 | 3 | 4 | 4 |
| | 11 | 98.9 | B-1 (0.3) | B-3 (0.3) | — | 0.5 | 70 | 0 | 2 | 3 | 4 |
| | 12 | 98.9 | B-2 (0.3) | B-3 (0.3) | — | 0.5 | 70 | 0 | 1 | 3 | 3 |
| | 13 | 98.9 | B-2 (0.3) | B-4 (0.3) | — | 0.5 | 60 | 0 | 2 | 4 | 4 |
| | 14 | 99.3 | — | — | C-3 (0.2) | 0.5 | 15 | 4 | 4 | 4 | 1 |
| | 15 | 98.9 | B-1 (0.3) | B-4 (0.3) | — | 0.5 | 50 | 0 | 4 | 4 | 4 |
| | 16 | 99.3 | — | — | C-2 (0.2) | 0.5 | 15 | 4 | 4 | 4 | 1 |

NOTES TO TABLE 1
Note 1 B-1: 2-(3,5-di-t-amyl-2-hydroxyphenyl)-benzotriazole
B-2: 2-[2-hydroxy-3,5-bis(αα-dimethyl-benzyl)phenyl]benzotriazole
Note 2 B-3: bis(2,2,6,6-tetramethyl-4-piperidyl)sebacate
B-4: dimethyl succinate/1-(2-hydroxyethyl)-4-hydroxy-2,2,6,6-tetramethylpiperidine polycondensate
Note 3 C-1: hexasodium triethylenetetramine-hexaacetate
C-2: tetrasodium ethylenediaminetetraacetate
C-3: tetrasodium ethylenedioxybis (ethylamine)-N,N,N',N'-tetraacetate
Note 4 - carbon black While the invention has been described in connection with what is presently and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A weather-resistant polyacetal resin composition comprising a polyacetal base resin, and a weather-resistant effective amount of a stabilization package consisting essentially of:

(1) between 0.01 to 3% by weight, based on the total composition weight, of (i) a benzotriazole selected from 2-(3,5-di-t-amyl-2-hydroxyphenyl)-benzotriazole and 2-[2-hydroxy-3,5-bis(α,α-dimethylbenzyl)phenyl]benzotriazole, and (ii) a hindered amine selected from bis(2,2,6,6-tetramethyl-4-piperidyl)sebacate, dimethyl succinate/1-(2-hydroxyethyl)-4-hydroxy-2,2,6,6-tetramethylpiperidine; and (2) between 0.01 to 3% by weight, based on the total composition weight, of a basic compound selected from hexasodium triethylenetetraminehexaacetate, tetrasodium ethylenediamine-teraacetate, and tetrasodium ethylenedioxybis(ethylemine)-N,N,N',N''-tetraacetate.

2. A weather-resistant polyacetal composition as in claim 1, which further contains between 0.01 to 5% by weight, based on the total composition weight, of a colorant.

3. A weather-resistant molded part formed of the composition of claims 1 or 2.

* * * * *